(12) United States Patent
Groves et al.

(10) Patent No.: US 6,964,317 B2
(45) Date of Patent: Nov. 15, 2005

(54) DRIVE ASSEMBLY FOR A HIGH GROUND CLEARANCE VEHICLE

(75) Inventors: Barry Stuart Groves, Roseville, MI (US); Patrick Michael Cadaret, Waterford, MI (US)

(73) Assignee: AxleTech International IP Holdings, LLC, Troy, MI (US)

( * ) Notice: Subject to any disclaimer, the term of this patent is extended or adjusted under 35 U.S.C. 154(b) by 126 days.

(21) Appl. No.: 10/389,192

(22) Filed: Mar. 14, 2003

(65) Prior Publication Data

US 2004/0178014 A1    Sep. 16, 2004

(51) Int. Cl.$^7$ .......................... B60K 17/04; B60G 3/14; F16H 7/06; F16H 35/06
(52) U.S. Cl. ...................... 180/344; 180/357; 180/363; 180/373; 474/146; 474/150
(58) Field of Search ............................... 180/344, 348, 180/357, 361, 363, 371, 372, 373, 24.05, 180/24.08; 474/144, 146, 148, 150

(56) References Cited

U.S. PATENT DOCUMENTS

| | | | | |
|---|---|---|---|---|
| 2,208,710 A | * | 7/1940 | Tjaarda | 180/357 |
| 2,610,048 A | * | 9/1952 | Lindgren | 180/357 |
| 3,145,797 A | * | 8/1964 | Taylor | 180/357 |
| 3,620,321 A | * | 11/1971 | Thibodeau | 180/24.05 |
| 4,098,111 A | * | 7/1978 | Hardmark et al. | 73/9 |
| 4,872,359 A | | 10/1989 | Schulz et al. | |
| 5,054,572 A | * | 10/1991 | Parker | 180/224 |
| 5,520,590 A | | 5/1996 | Showalter et al. | |
| 5,954,612 A | | 9/1999 | Baxter, Jr. | |
| 5,984,821 A | | 11/1999 | Showalter | |
| 6,142,494 A | | 11/2000 | Higuchi | |
| 6,203,465 B1 | | 3/2001 | Showalter | |
| 6,231,470 B1 | | 5/2001 | Cook et al. | |
| 6,364,048 B1 | | 4/2002 | McComber | |
| 6,405,822 B1 | | 6/2002 | Lee | |
| 6,406,043 B1 | | 6/2002 | Balmer | |

* cited by examiner

*Primary Examiner*—Peter C. English
(74) *Attorney, Agent, or Firm*—Howard & Howard

(57) ABSTRACT

A high ground clearance drive assembly includes a drop box and an articulation drop box. The drop box is fixed to the vehicle frame and the articulation drop box pivots relative thereto as a suspension system is exercised. The articulation drop box is pivotable about a pivot pin which extends through both the articulation drop box and the drop box to provide an axial preload therebetween. A first chain interconnects an input sprocket on the input shaft and an intermediate sprocket assembly. A second chain interconnects a second intermediate sprocket and the output sprocket to drive an output shaft connected thereto. A hollow shaft supports the first and second intermediate sprockets about the pivot pin such that rotation of the articulation drop box relative the drop box is accommodated without additional complex structure.

20 Claims, 8 Drawing Sheets

US 6,964,317 B2

DRIVE ASSEMBLY FOR A HIGH GROUND CLEARANCE VEHICLE

TECHNICAL FIELD

The present invention relates to a vehicle drive system, and more particularly to an articulating drop box driven by a chain drive.

BACKGROUND OF THE INVENTION

In recent years attention has been given to development of high clearance agricultural vehicles which move across the ground without damage to the agricultural products. These requirements have led to the development of vehicles that include relatively large ground wheels and raised axles so that the vehicle can pass over a top of a crop when partly or fully grown. In order to enable the vehicle to move across the ground at relatively high speed, suspension systems are necessary between the ground wheels and the axle to allow suspension movement of the ground wheels and to accommodate changes in ground level. In addition, it is necessary for the spacing between the ground wheels to be adjustable to allow the ground wheels to pass between the rows of crop and to accommodate different spacing of the row. These requirements have required special developments in the suspension systems and various techniques have been developed to overcome these problems.

One conventional agricultural vehicle suspension system utilizes tall drop boxes. The tall drop boxes transfer torque from a drive shaft, which is positioned relatively high from the ground, to a wheel hub. The tall drop boxes pivot about a pivot pin displaced from the drive shaft. Structural members above the vehicle wheels support the pivot pin. As the drive shaft connection is displaced from the pivot location the drive shaft connection is swung through an arc during articulation of the suspension. As such, relatively high suspension loads are applied directly to the pivot pin. The drive input is relatively complicated as it must accommodate the arcuate movement when the suspension is exercised. In addition, as the tall drop boxes span the height of the wheels, the wheel height is inherently limited by the drop box height.

Accordingly, it is desirable to provide a suspension system for an agricultural vehicle that provides high ground clearance, minimizes drive connection complexity and reduces high moments on the suspension system components.

SUMMARY OF THE INVENTION

A drive assembly for a vehicle having a frame. The drive assembly comprises a drop box adapted to be fixedly secured to the frame of the vehicle. An input shaft is rotatably disposed within the drop box. An articulation drop box is pivotally mounted to the drop box. An output shaft is rotatably disposed within the articulated drop box. An intermediate sprocket assembly couples the input shaft to the output shaft to transfer torque from the input shaft to the output shaft. A pivot pin extends through the drop box and the articulation drop box with the intermediate sprocket assembly disposed about the pin and the articulation drop box pivoting about the pin.

The present invention therefore provides a drive system having a high ground clearance, minimizes drive connection complexity and reduces high moment loads on the suspension components.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
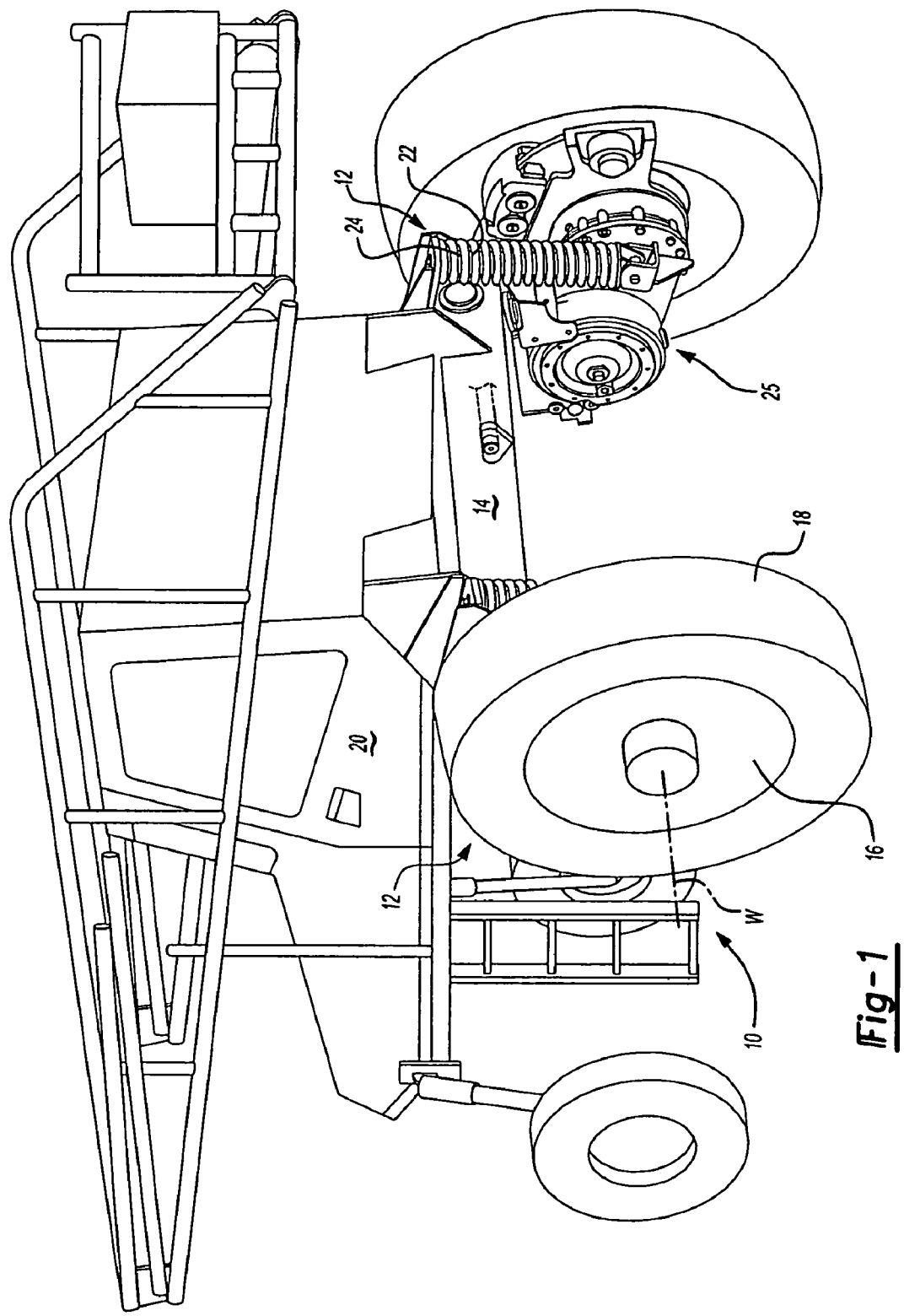
FIG. 1 is a perspective view of an exemplary high ground clearance vehicle for use with the present invention.

Referring to the Figures wherein like numerals indicate like or corresponding parts throughout the several views, FIG. 1 illustrates a general perspective view of a vehicle 10 having a high ground clearance. The vehicle 10 is used for various different purposes including transportation and spreading of particulate material and liquid material on agricultural products.

A suspension system 12 is mounted to a frame 14 to support a pair of wheel hubs 16 and relatively tall wheels 18. For example, the relatively tall wheels 18 can drive down rows between a series of crops and the raised frame 14 can pass over the top of partly or fully grown crops. The suspension system 12 is resiliently mounted to the frame 14 through a spring 22 and damper 24 or other biasing arrangement.

A vehicle body 20 or the like is mounted to the frame 14. The body 20 may include a storage container together with a boom which extends outwardly to each side of the vehicle 10. It should be understood that various vehicle components and configurations will benefit from the drive system of the present invention.

Figure 2:
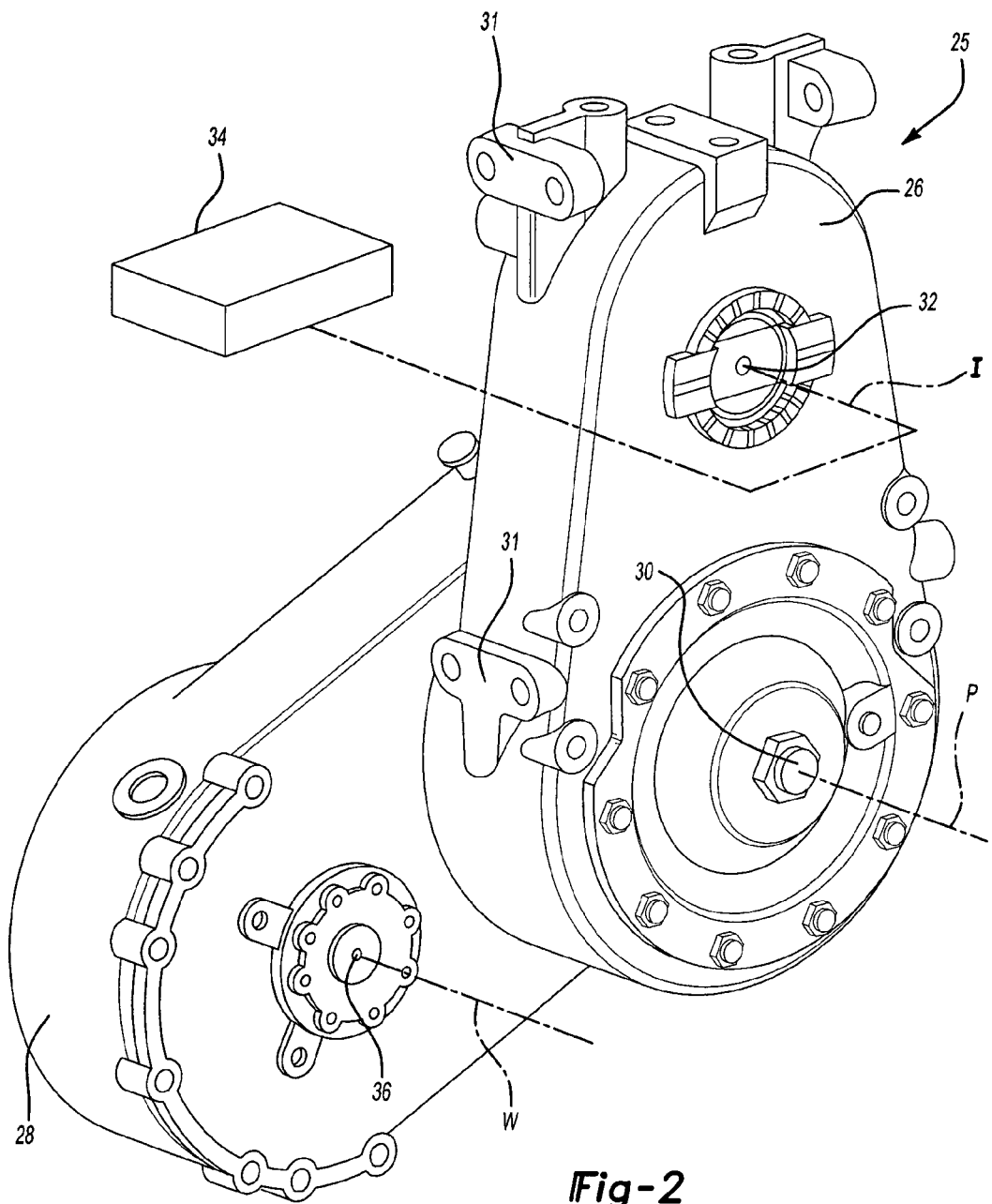
FIG. 2 is a perspective view of the drive system of the present invention.
Figure 3:
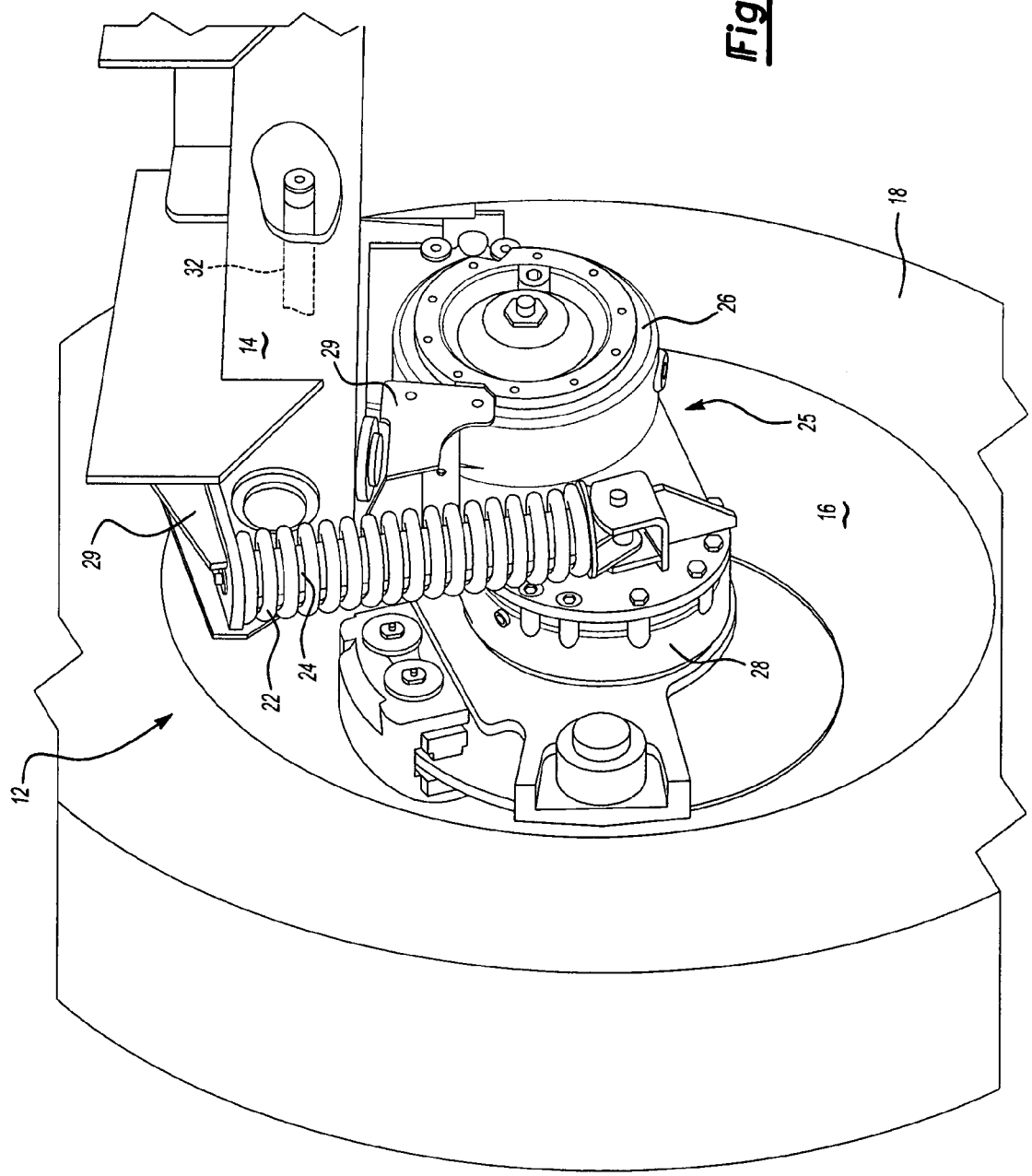
FIG. 3 is a perspective view of the drive system according to the present invention as mounted to an inner portion of a vehicle wheel hub.
Figure 7:
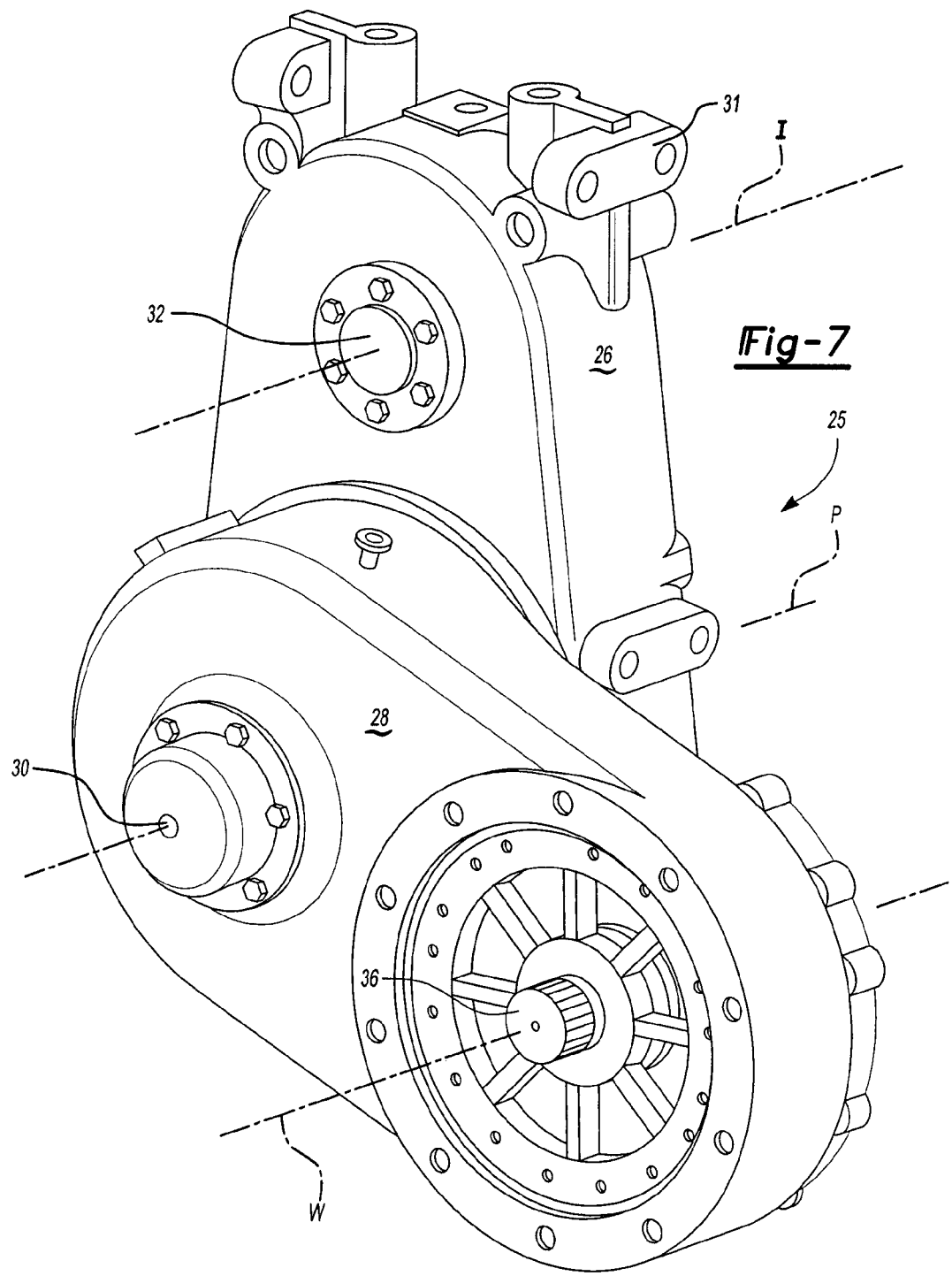
FIG. 7 is another perspective view of the drive system of the present invention.

Referring to FIGS. 2, 3, and 7, the suspension system 12 includes a drive assembly 25 having a drop box 26 and an articulation drop box 28. The drop box 26 is fixed to the vehicle frame 14 (FIG. 3) through a mounting bracket 29 and integral mounting points 31. The spring 22 and damper 24 are preferably mounted between the mounting bracket 29 and the articulation drop box 28. It should be understood that various bracket and mounting arrangements will benefit from the present invention.

An input shaft 32, along an input axis I, receives torque into the drive assembly 25 from a vehicle engine and transmission arrangement (illustrated schematically at 34). The input shaft 32 requires minimal articulated connection as the drop box 26 is fixed to the frame 14. That is, the drop box 26 does not articulate and the connection between the input shaft 32 and a transmission arrangement (illustrated schematically at 34) is relatively straight uncomplicated and robust. It should be understood that the transmission arrangement is driven by a conventional connection to the engine.

The articulation drop box 28 is pivotable about a pivot pin 30 which defines a pivot axis P of the drive assembly 25. The articulation drop box 28 is adjacent and offset from the drop box 26 such that the articulation drop box 28 fits essentially within the wheel hub 16 (FIG. 3). The drive assembly 25 therefore does not limit the size of the wheels 18 as no support structure is required above the wheels 18.

Figure 4:
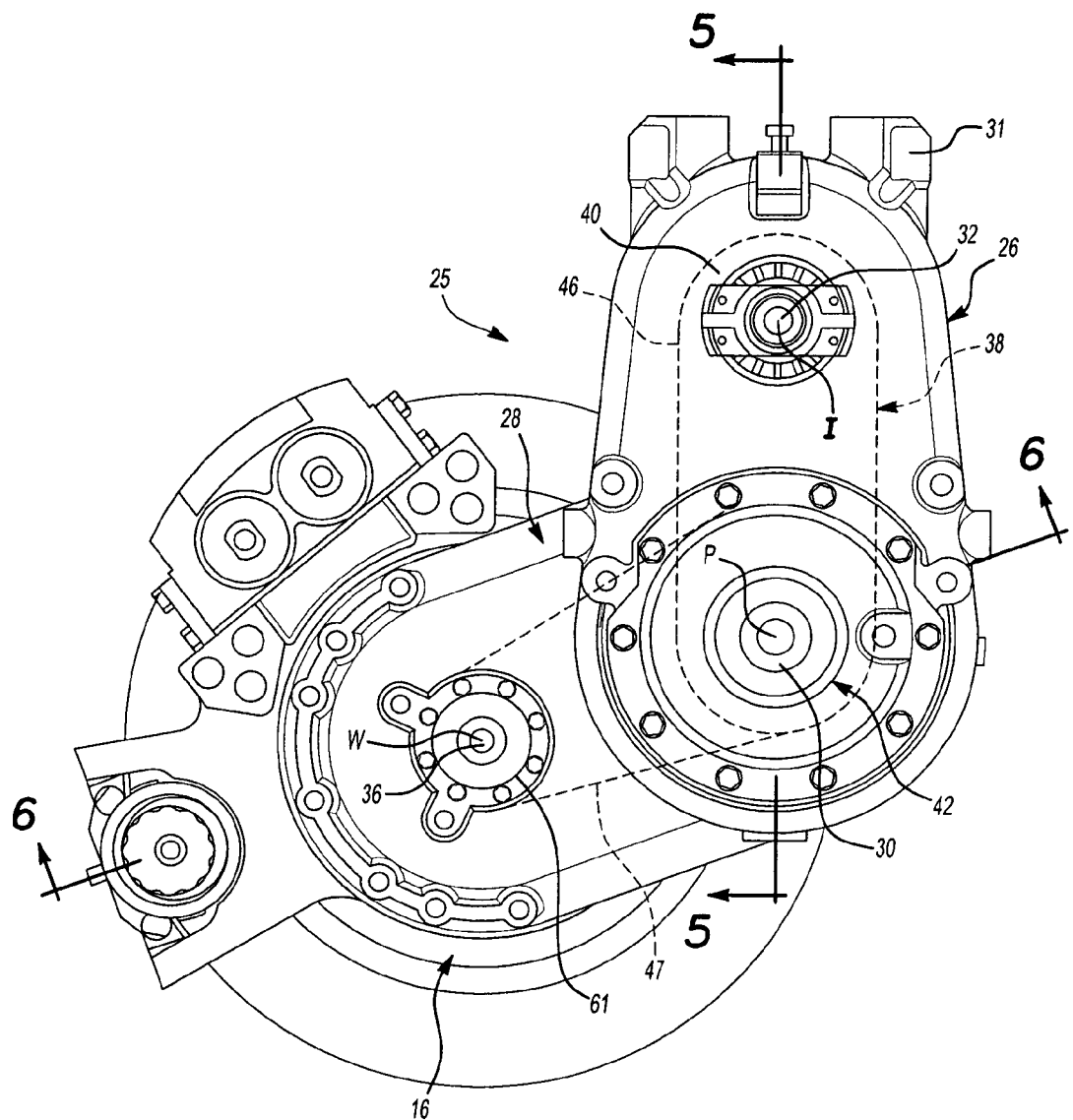
FIG. 4 is a front view of the drive system as viewed from the vehicle centerline toward the wheel.

Referring also to FIG. 4, the input shaft 32 in the drop box 26 drives an output shaft 36 (see also FIG. 6) through a chain drive 38. It should be understood that drive assemblies, such as gearing arrangements, will also benefit from the present invention. The chain drive 38 includes an input sprocket 40, an intermediate sprocket assembly 42 and an output sprocket 61. A first chain 46 interconnects the input sprocket 40 and the intermediate sprocket assembly 42 and a second chain 47 interconnects the intermediate sprocket assembly 42 and the output sprocket 61. For illustrative purposes, the input sprocket 40, intermediate sprocket assembly 42, and output sprocket 61 are all shown schematically in FIG. 4.

Figure 5:
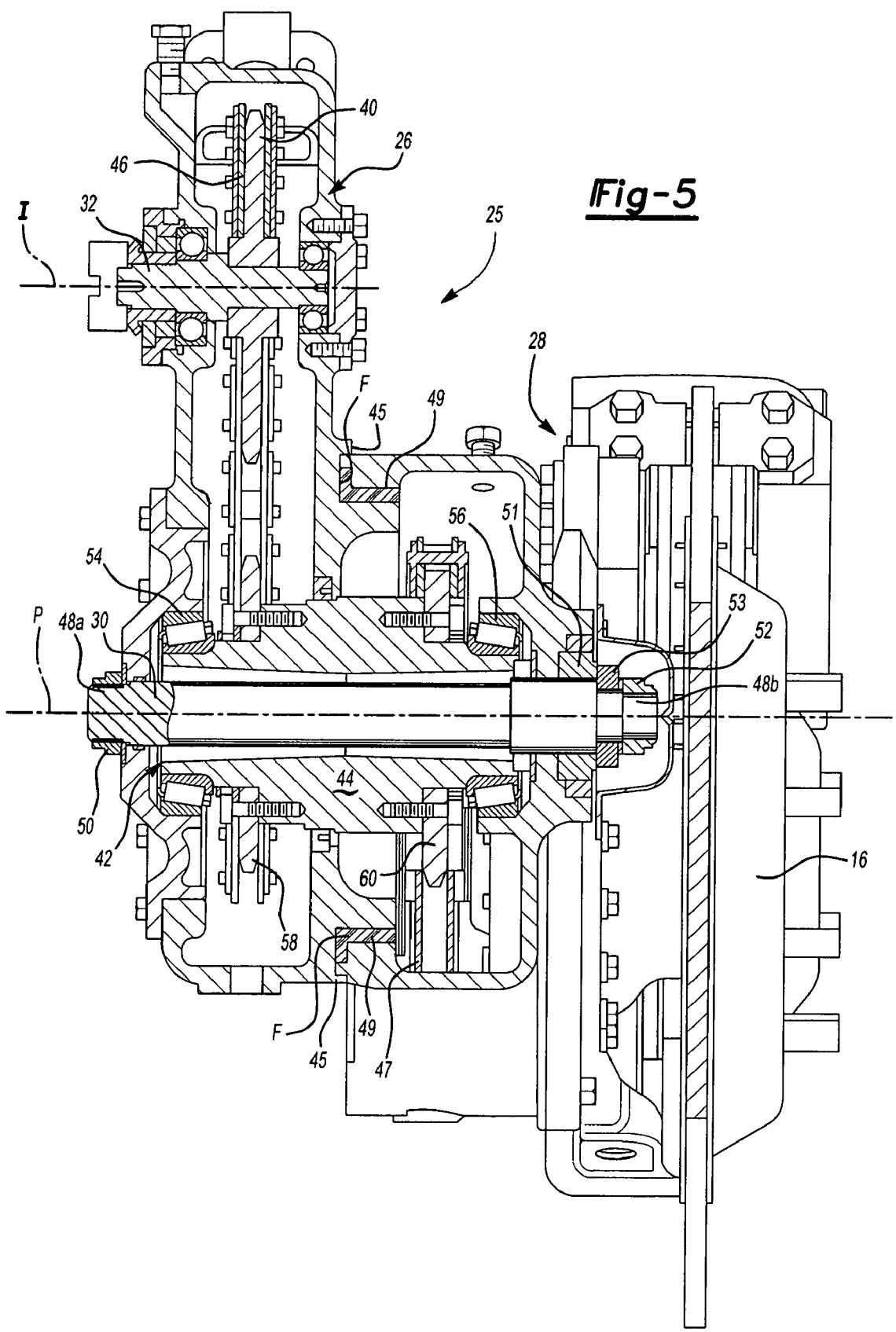
FIG. 5 is a section view of the drive system taken along line 5—5 of FIG. 4.

Referring to FIG. 5, the input sprocket 40 is mounted to the input shaft 32 within the drop box 26. The first chain 46 interconnects the input sprocket 40 and the intermediate sprocket assembly 42. The intermediate sprocket assembly 42 is mounted about the pivot axis P. That is, the articulation drop box 28 receives torque from the intermediate sprocket assembly 42 which rotates about axis P. Such an arrangement advantageously provides a drive input which rotates but does not travel through an arc during suspension articulation.

The intermediate sprocket assembly 42 includes a hollow shaft 44 mounted coaxial with the pivot pin 30. The pivot pin 30 is mounted through the articulation drop box 28 and the drop box 26 along the pivot axis P. Each end 48a, 48b of the pivot pin 30 is threaded to receive a threaded fastener 50, 52 to pivotally retain the articulation drop box 28 to the drop box 26. By tightening the threaded fastener 50, 52 an axial preload is applied to the pivot pin 30 and an interface between the articulation drop box 28 and the drop box 26. The axial preload allows the interface F between the articulation drop box 28 and the drop box 26 to transfer moments therebetween.

Figure 8:
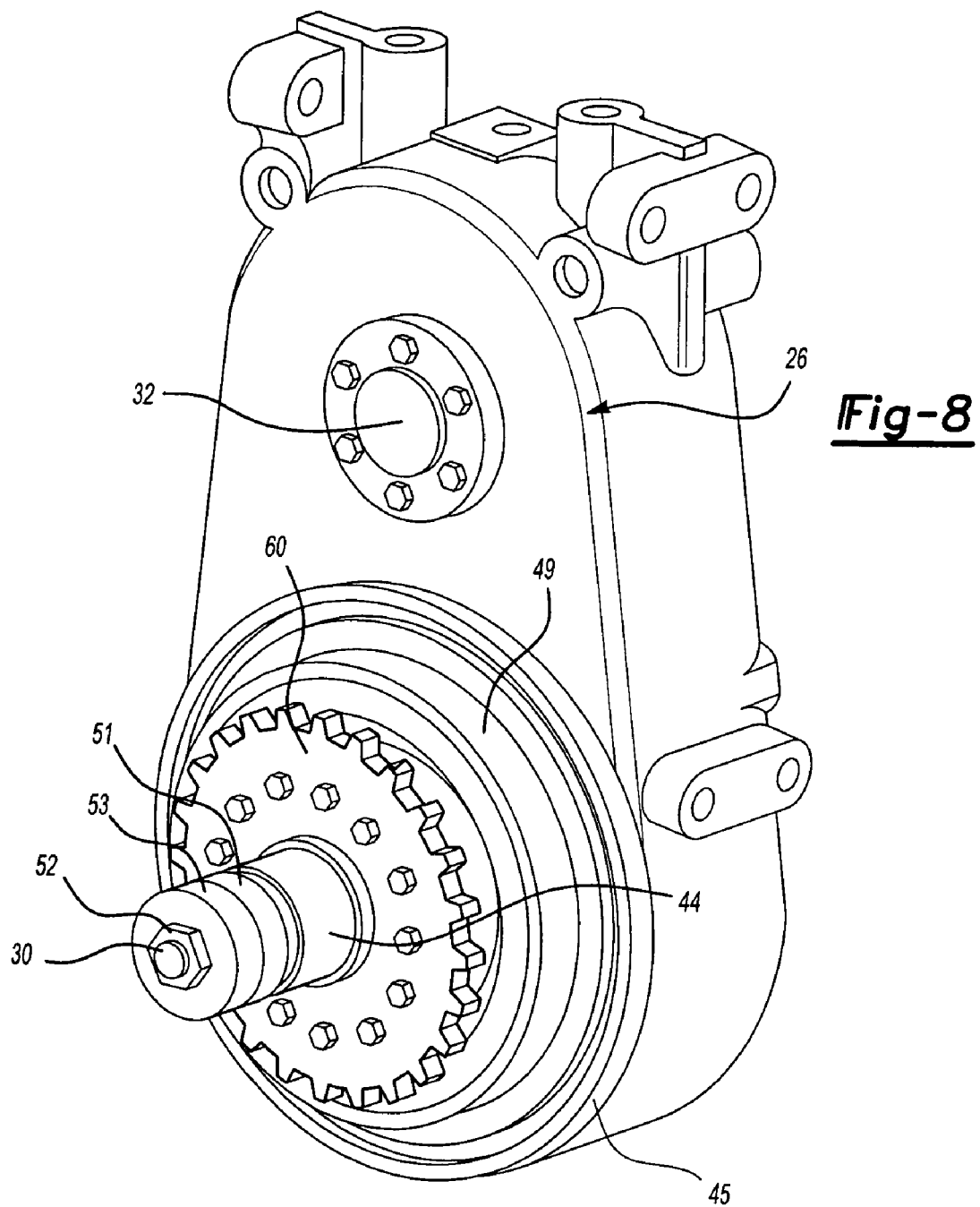
FIG. 8 is a perspective view of a fixed drop box of the present invention with the articulation drop box removed to illustrate the interface.

As also shown in FIG. 8, the interface F is preferably a thrust bushing 49 having a first portion and a second portion, preferably of L-shape in cross-section, wedged between the surfaces of the articulation drop box 28 which contacts the drop box 26. The first portion is substantially parallel with the pivot axis P. The second portion extends comprises a flange that from the first portion and is substantially transverse to the pivot axis P. A lip 45 preferably extends from the drop box 26 to surround the bushing 49 and provides labyrinth protection for a rubber seal mounted in articulation drop box 28 at the thrust bushing O.D. The thrust bushing 49 defines a relatively large diameter to provide an extended radial interface F which surrounds the pivot pin 30. That is, a relatively large wear surface contact area is provided between the articulation drop box 28 and the drop box 26 to provide a thrust couple therebetween. Preferably, the thrust bushing 49 is manufactured of a polymeric material such as, for example, nylon or the like to provide a durable wear surface.

The thrust bushing 49 operates with a thrust bearing 51 and a washer 53 under the fastener 52 such that the thrust bearing 51 is sandwiched between the washer 53 and the articulation drop box 28 (also illustrated in FIG. 8). The thrust bushing 49 and thrust bearing 51 support the preload thrust force from the pivot pin 30 and allow relative rotating motion between drop box 26 and articulation drop box 28.

The interface F supports external vertical loads applied to the wheel hub 16. A thrust couple between the bushing 49 and thrust bearing 51 is capable of supporting moments resulting from axial offset distances between loadings into articulation drop box 28 and transferring this moment into drop box 26. A strong rigid interface is thereby provided which locates the pivot axis P low relative to the ground yet provides a relatively high ground clearance which does not limit wheel height. Preferably, each box, 26, 28 can be separately sealed such that each box 26, 28 can include separate oil reservoirs.

Figure 6:
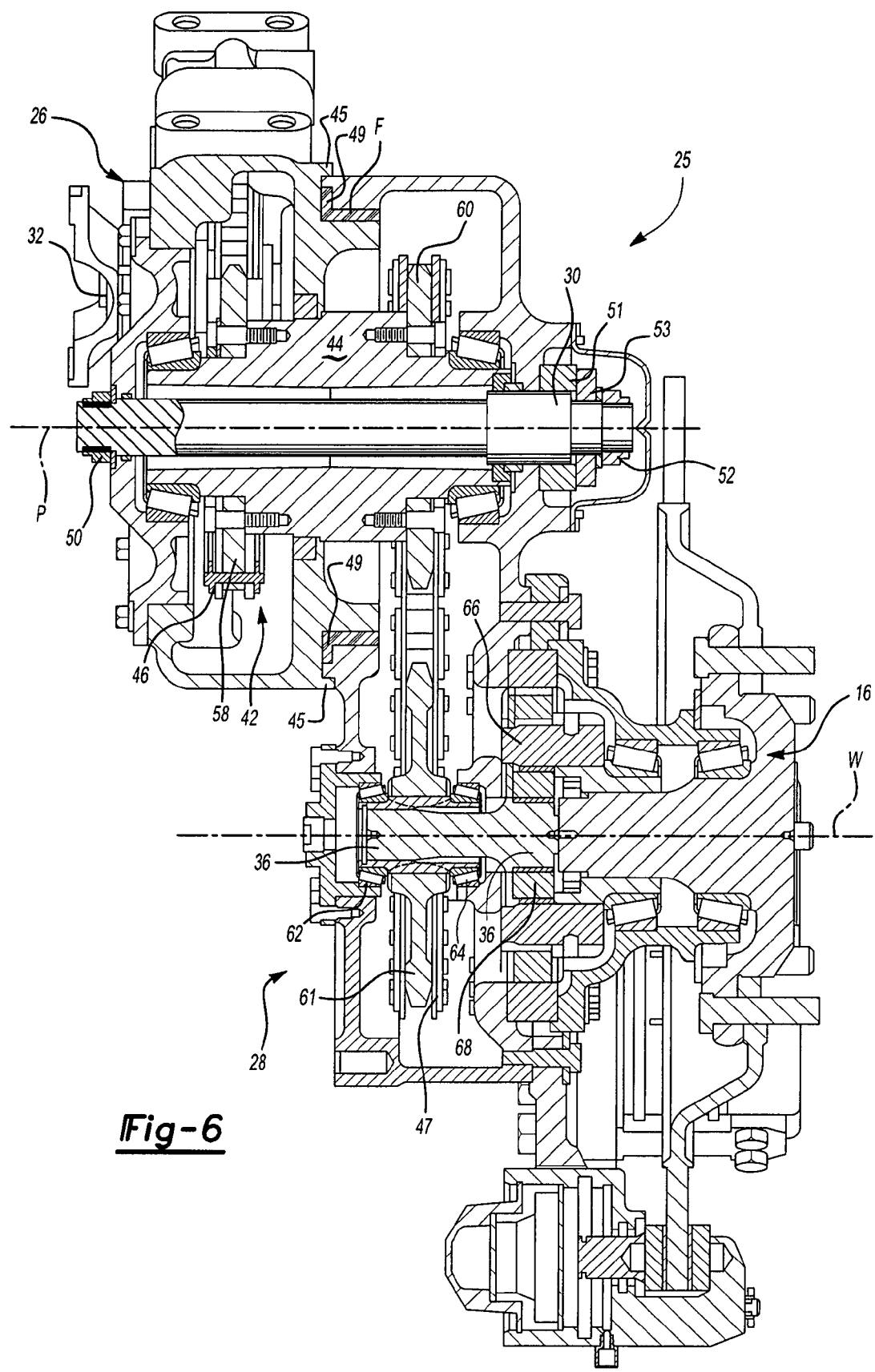
FIG. 6 is a section view of the drive system taken along line 6—6 of FIG. 4.

The hollow shaft 44 of the intermediate sprocket assembly 42 is rotationally mounted about the pivot axis P through bearings 54, 56. Bearings 54, 56 support the hollow shaft 44 and preferably do produce a thrust load component that reduces the thrust preload on interface F. As shown in FIGS. 5 and 6, bearing 54 is disposed between the drop box 26 and one end of the hollow shaft 44 and bearing 56 is disposed between the articulation drop box 28 and another end of the hollow shaft 44 such that the bearings 54, 56 are removed from the pivot pin 30. It should be understood that various lubrication schemes will also benefit the present invention.

As the bushing 49 is a large diameter and the pivot pin 30 under axial preload extends through the articulation drop box 28 and the drop box 26, the moment capacity of the drive assembly 25 is relatively high. The high moment capacity of the drive assembly 25 allows the wheel track position to be outboard of the bushing 49 and also allows side skid loads, tractive driving, and braking loads to be transferred between the articulation drop box 28 and the drop box 26 through interface F. Furthermore, as the wheel track position is outboard of the bushing 49, the wheel track position is readily adjustable to, for example only, crop row spacing.

The hollow shaft 44 supports a first intermediate sprocket 58 and a second intermediate sprocket 60. The input shaft 32 drives the first intermediate sprocket 58 through the first chain 46. The first intermediate sprocket 58 rotates the hollow shaft 44 which rotates the second intermediate sprocket 60 therewith about the pivot pin 30. As the hollow shaft 44 rotates about the pivot pin 30, rotation of the articulation drop box 28 relative the drop box 26 is accommodated without additional complex structure.

Referring to FIG. 6, the second chain 47 interconnects the second intermediate sprocket 60 and the output sprocket 61 to drive the output shaft 36 connected thereto. The output shaft 36 is rotationally mounted about a wheel axis W through bearings 62, 64. The output shaft 36 is a floating output sun gear which drives the wheel hub 16 through a reduction gear arrangement 66 such as a planetary gear arrangement. It should be understood that various wheel ends and gear arrangements may be engaged with output shaft 36. Wheel ends that include adjustable track spacing will particularly benefit from the present invention.

The height of the pivot axis P and the reduction ratios between the pivot axis P and the ground relate the interaction of the articulation drop box 28 and the drop box 26. The interaction of the articulation drop box 28 and the drop box 26 may be varied to change the suspension response to driving torque and braking torque due to this interaction.

Preferably, when driving torque is applied the articulation drop box 28 rotates downward relative the drop box 26 which raises the rear of the vehicle about the pivot axis P That is, the arrangement of the present invention effectively increases the spring force to counteract drive torque. Such lifting is advantageous in many vehicles which may otherwise squat during drive torque input.

It should be further understood that the present invention is not limited to a rigid drop box. The articulation drop box 28 may alternatively be mounted directly to a fixed frame component rather than the drop box 26. That is, the thrust bushing 49 is mounted between the articulation drop box 28 and a fixed vehicle component such that torque is received into the intermediate shaft assembly 42 which pivots about axis P.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A drive assembly for a vehicle having a frame, said drive assembly comprising:
    a drop box adapted to be fixedly secured to the frame of the vehicle;
    an input shaft rotatably disposed within said drop box;
    an articulation drop box pivotally mounted to said drop box;
    an output shaft rotatably disposed within said articulation drop box;
    an intermediate sprocket assembly coupling said input shaft to said output shaft to transfer torque from said input shaft to said output shaft;
    a pivot pin defining a pivot axis and extending through both said drop box and said articulation drop box with said intermediate sprocket assembly disposed about said pivot pin and said articulation drop box selectively pivoting about said pivot pin; and
    a thrust bushing disposed between said drop box and said articulation drop box with said thrust bushing having a first portion substantially parallel with said pivot axis and wedged between said drop box and said articulation drop box to define a radial interface surrounding said pivot pin for supporting a preload thrust force from said pivot pin and for allowing relative rotational motion between said drop box and said articulation drop box.

2. A drive assembly as recited in claim 1 wherein said intermediate sprocket assembly comprises a hollow shaft mounted about said pivot pin with a first sprocket mounted to said hollow shaft and a second sprocket mounted to said hollow shaft.

3. A drive assembly as recited in claim 1 further comprising a wheel hub driven by said output shaft.

4. A drive assembly as recited in claim 1 further including a lip extending from said drop box to surround said thrust bushing.

5. A drive assembly as recited in claim 1 further comprising a first chain mounted between said input shaft and said intermediate sprocket assembly and a second chain mounted between said intermediate sprocket assembly and said output shaft.

6. A drive assembly system as recited in claim 1 further comprising a biasing member supporting said articulation drop box.

7. A drive assembly system as recited in claim 1 further including a chain drive interconnecting said input shaft, said intermediate sprocket assembly, and said output shaft.

8. A drive assembly as recited in claim 1 wherein said pivot pin operates under an axial preload.

9. A drive assembly as recited in claim 1 further comprising a thrust bearing mounted about said pivot pin with said thrust bearing and said thrust bushing supporting a preload thrust force from said pivot pin to allow relative rotating motion between said drop box and said articulation drop box.

10. A drive assembly as recited in claim 1 wherein said thrust bushing includes a second portion extending from said first portion substantially transverse to said pivot axis and wedged between said drop box and said articulation drop box.

11. A drive assembly as recited in claim 10 wherein said second portion of said thrust bushing is further defined as a flange extending perpendicularly from said first portion of said thrust bushing.

12. A drive assembly as recited in claim 11 wherein said first portion and said second portion present a generally L-shaped configuration.

13. A drive assembly as recited in claim 12 wherein said thrust bushing is formed of a polymeric material.

14. A drive assembly for a vehicle having a frame, said drive assembly comprising:
    a drop box adapted to be fixedly secured to the frame of the vehicle;
    an input shaft rotatably disposed within said drop box;
    an articulation drop box pivotally mounted to said drop box;
    an output shaft rotatably disposed within said articulation drop box;
    a pivot pin defining a pivot axis extending through both said drop box and said articulation drop box;
    an intermediate sprocket assembly coupling said input shaft to said output shaft to transfer torque from said input shaft to said output shaft with said sprocket assembly including a hollow shaft mounted coaxial with said pivot axis and spaced about said pivot pin, said hollow shaft having a first end connected to said drop box and a second end connected to and supporting said articulation drop box; and
    first and second bearings supporting said hollow shaft with said first bearing disposed between said drop box and said first end of said hollow shaft and said second bearing disposed between said articulation drop box and said second end of said hollow shaft such that said bearings are removed from said pivot pin.

15. A drive assembly as recited in claim 14 further comprising a first sprocket mounted to said hollow shaft and a second sprocket mounted to said hollow shaft.

16. A drive assembly as recited in claim 15 further comprising a first chain mounted between said input shaft and said first sprocket and a second chain mounted between said second sprocket and said output shaft.

17. A drive assembly as recited in claim 14 further including a chain drive interconnecting said input shaft, said intermediate sprocket assembly, and said output shaft.

18. A drive assembly as recited in claim 14 further including a thrust bearing mounted between said pivot pin and said articulation drop box to allow relative rotating motion between said drop box and said articulation drop box.

19. A drive assembly as recited in claim 14 further including threaded fasteners mounting said pivot pin to said drop box and said articulation drop box.

20. A drive assembly as recited in claim 14 further including a thrust bushing disposed between said drop box and said articulation drop box to define a radial interface surrounding said pivot pin and to support a preload thrust force from said pivot pin with said hollow shaft producing a thrust load component reducing said preload thrust force on said radial interface.

\* \* \* \* \*